United States Patent [19]

Castoe

[11] 4,305,570

[45] Dec. 15, 1981

[54] CAMBER ADJUSTMENT TOOL

[76] Inventor: John H. Castoe, 10234 McVine St., Sunland, Calif. 91040

[21] Appl. No.: 106,235

[22] Filed: Dec. 21, 1979

[51] Int. Cl.³ .............................................. B66F 3/08
[52] U.S. Cl. ................................................. 254/100
[58] Field of Search ............. 33/180 AT, 203, 203.18; 72/704, 316, 381, 386–390; 254/100, 1, 231; 81/3 R

[56] References Cited

U.S. PATENT DOCUMENTS 3,731,906  5/1973  Beach .................................. 254/100
4,117,709  10/1978  Jackson ............................. 72/704 X Primary Examiner—Robert C. Watson
Attorney, Agent, or Firm—Christie, Parker & Hale

[57] ABSTRACT

A camber adjustment tool for a McPherson front end suspension system comprises a rigid base for being fastened to the face of a wheel hub. The wheel mounting studs extend through elongated holes in the base that facilitate fastening the base to the hub independently of different wheel stud patterns. Cammed sleeves inserted in the holes around the wheel studs prevent damaging the threads of the studs and provide rigid bearing surfaces for attaching the base to the hub. An adjustable foot releasably secured to the bottom of the base rests on the floor and rigidly supports the wheel hub above the floor. An instrument mounting bridge spaced from and extending parallel to the face of the base facilitates supporting a camber indicating gauge adjacent the hub independently of the wheel stud pattern. An adjustable collar is swivel mounted to the end of a rigid force-applying arm, which in turn, is fastened by a pair of adjustment nuts to the top of the base. The collar is fastened around the circumference of a McPherson strut, and either of the adjustment nuts is tightened to move the force-applying arm toward or away from the strut for progressively applying force to either side of the strut for increasing or decreasing the wheel camber, respectively.

28 Claims, 7 Drawing Figures

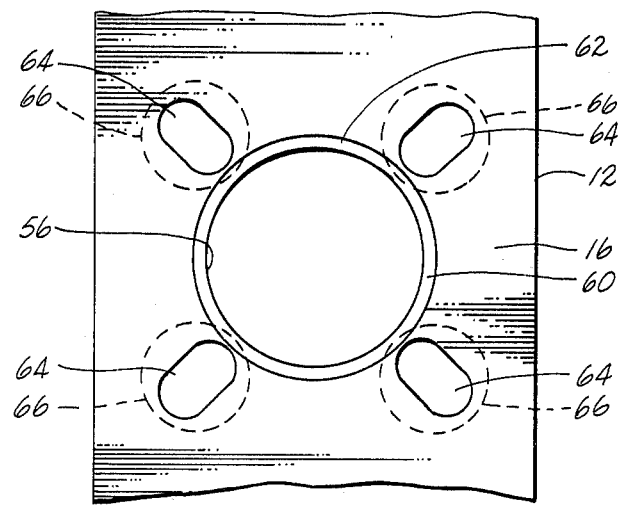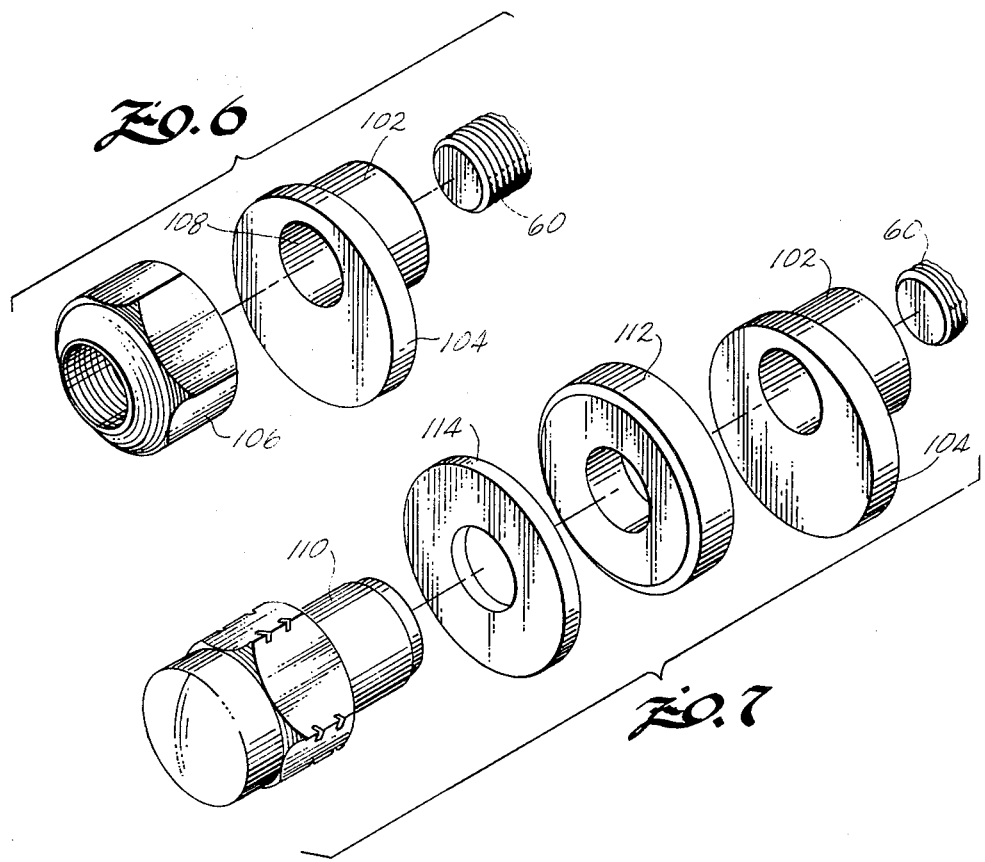

CAMBER ADJUSTMENT TOOL

BACKGROUND

This invention relates in general to vehicle repair equipment, and more particularly to a device used for adjusting the wheel camber of a vehicle front end suspension system.

A number of foreign made automobiles have McPherson front end suspension systems. These suspension systems are characterized by a McPherson strut that provides both suspension and shock absorbing functions. The McPherson strut is susceptible to being bent upon impact of the wheel which can upset the desired wheel camber setting.

U.S. Pat. No. 4,117,709 to Jackson discloses a tool for being attached to the wheel hub assembly of a McPherson suspension system to impart corrective forces to the McPherson strut in order to correct the camber setting. The tool includes a base or plate attached to the mounting studs of the wheel hub. A gauge for measuring and indicating camber is attached to the base of the tool, or directly to the wheel hub. A pair of inclined arms extend away from the base, and a swivel fitting carried by the arms holds a hydraulic cylinder for positioning the ram of the cylinder against the side of the McPherson strut. Camber is decreased by forcing the ram outwardly against the strut to apply a bending force to the strut to correct the camber setting. To decrease camber a chain must be wrapped around the strut and the hydraulic cylinder is then operated to retract the ram to pull the chain against the strut to correct the camber setting. The hydraulic ram produces point loading on the strut housing, which can damage the strut housing. Use of the chain to attach the ram to the strut can cause damage to the strut housing from the links of the chain. The base of the tool, which is attached directly to the wheel hub, supports the camber gauge, but the lug nuts on the wheel studs can interfere with mounting the camber gauge in this manner for some wheel stud patterns.

The present invention provides a camber adjusting tool that avoids point loading on the strut housing and also does not require the use of a chain or the like when applying force to the strut. The tool of this invention facilitates use with different type of camber gauges independently of the wheel stud pattern.

The tool of this invention is adapted for use with the wheel removed. The tool includes means for resting on the floor to rigidly support the wheel hub above the floor when the camber is being adjusted. The tool ensures that the center of the wheel hub is accurately positioned at the proper elevation above the floor. The tool also provides safe and rigid attachment to the wheel hub, and it provides a safe means of supporting the wheel hub above the floor. In addition, the tool prevents damage to the threads of the wheel studs during use.

SUMMARY OF THE INVENTION

Briefly, the invention provides a tool for adjusting wheel camber of a vehicle suspension system of the McPherson type having a strut extending adjacent a wheel hub. The tool includes a rigid base for being fastened to the wheel hub. A rigid force-applying arm carried on the base has a collar for being releasably secured around the circumference of the strut. The location at which the arm is attached to the base is adjustable so that the arm can be extended toward the strut or drawn away from the strut. This progressively applies and retains a force against either side of the strut for either increasing or decreasing the wheel camber setting.

The collar, in extending around the circumference of the strut, avoids damaging point loading on the strut. The force-applying arm, being adjustable toward or away from the base, provides a means for continuously applying and retaining a positive force on either side of the strut for increasing or decreasing camber. This provides accurate control over the camber correction and also avoids use of a chain, or other similar attachment device, that can damage the strut housing under loading.

The tool includes an instrument mounting bridge positioned adjacent to and spaced from the wheel hub and extending parallel to the wheel hub. This provides means for positioning the camber gauge to obtain accurate camber readings while avoiding interference to the gauge mounting by the wheel studs. The tool also includes elongated holes arranged to receive wheel mounting studs for different wheel stud patterns. The tool can be attached to the wheel hub by apparatus that includes protective sleeves for preventing damage to the wheel studs when the tool supports the weight of the wheel hub assembly. Means are also provided for ensuring a safe and secure attachment of the tool to the wheel studs and for safely mounting and accurately locating the center of the wheel hub assembly at the desired elevation above the floor.

These and other aspects of the invention will be more fully understood by referring to the following detailed description and the accompanying drawings.

DRAWINGS

FIG. 5 is a fragmentary elevation view taken on line 5—5 of FIG. 4 and showing the rear side of the camber adjusting tool;

FIG. 6 is an exploded perspective view showing one means for attaching the camber adjusting tool to a wheel hub of the suspension system; and FIG. 7 is an exploded perspective view showing an alternative means for attaching the camber adjusting tool to the wheel hub.

DETAILED DESCRIPTION

Figure 1:
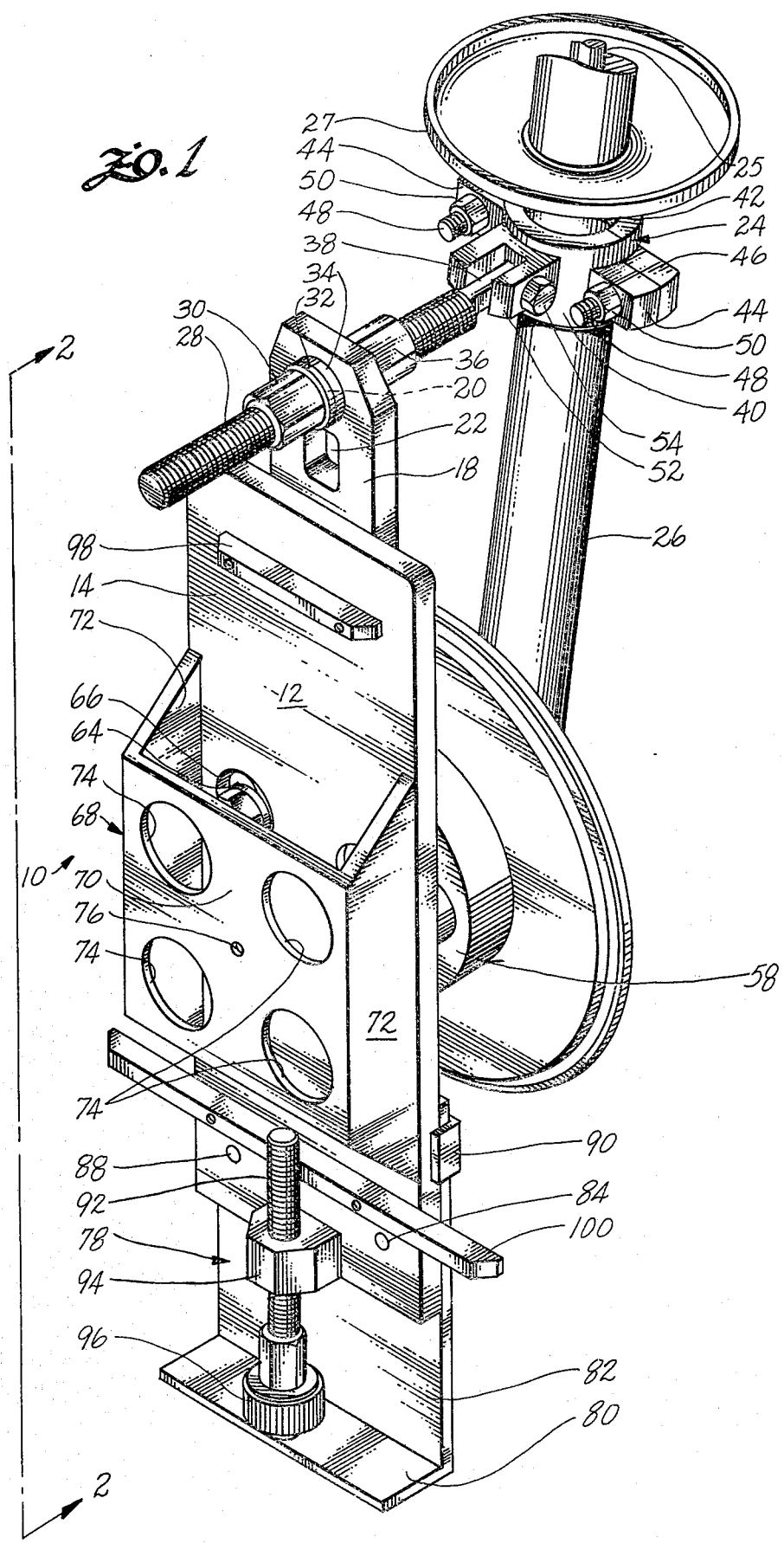
FIG. 1 is a perspective view showing a camber adjustment tool of this invention in place on a McPherson strut suspension system.
Figure 2:
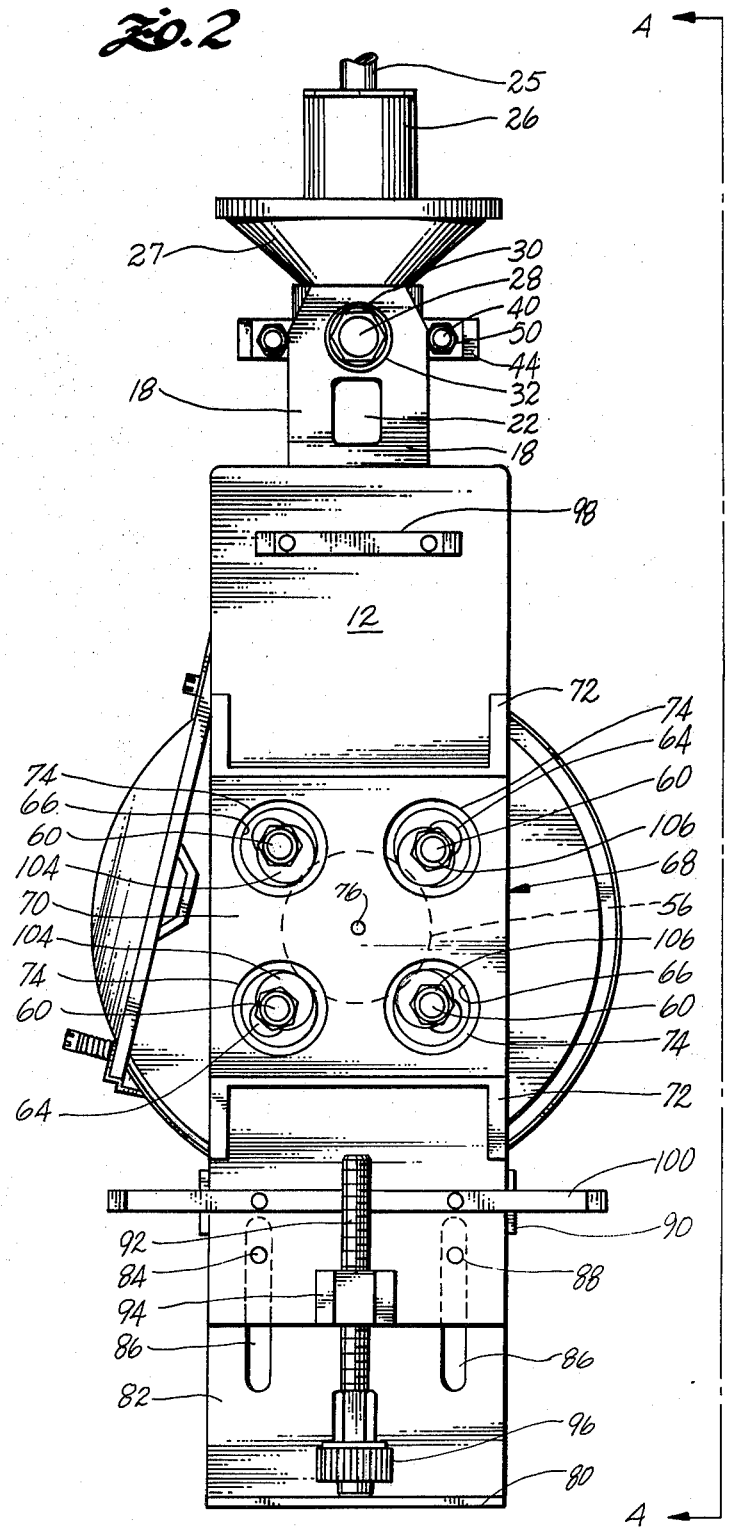
FIG. 2 is a front elevation view taken on line 2—2 of FIG. 1.
Figure 3:
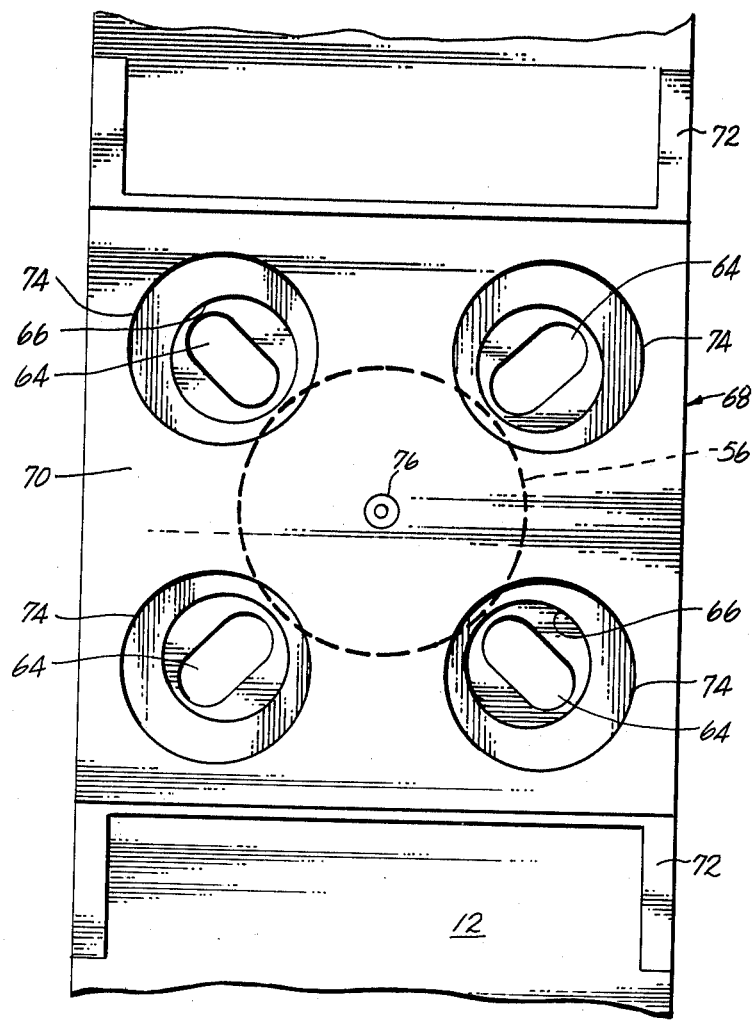
FIG. 3 is a fragmentary front elevation view showing a portion of the chamber adjustment tool detached from the suspension system.

A camber adjusting tool 10 according to principles of this invention includes an elongated rigid metal base 12 having a flat front face 14 and a flat rear face 16.

A rigid bracket 18 is rigidly affixed to an upper portion of the base. The bracket comprises a separate metal piece that is preferably welded to an upper portion of the rear face of the plate 12, so that the principal portion of the bracket projects above the top edge of the base.

A pair of spaced apart upper and lower holes 20, 22, respectively, extend through the bracket 18.

The bracket mounts a collar 24 for use in applying force to a McPherson strut 25 of a vehicle front suspension system. The strut is inside a strut housing 26 having the usual spring guide 27. The collar 24 is carried on the remote end of an externally threaded, elongated, rigid force-applying arm 28 extending through the upper hole 20 in the bracket 18. The arm extends perpendicular to the plane of the bracket 18. The arm 28 is adjustably attached to the bracket by a nut 30, tightened against washers 32, 34 bearing against a front face of the bracket and by a nut 36, tightened against similar washers (not shown) bearing against the rear face of the bracket 18. A swivel fitting 38 at the remote end of the arm is spaced from the rear face of the bracket 18. The collar 24 swivels on the swivel fitting 38. The collar includes a generally semi-circular front fitting 40 and a cooperating generally semi-circular rear fitting 42. The front fitting has a pair of ears 44 projecting outwardly for abutting against a similar pair of ears 46 on the rear fitting. Separate bolts 48 extend through the ears on opposite sides of the collar, and a separate nut 50 on each bolt is tightened for securing the collar around the circumference of the strut housing 26. The inside surface of the collar is generally elliptical in the shape and somewhat oversized with respect to smaller struts so that the same collar can be secured around strut housings of different sizes. The inside surface of the collar can be configured to match the contour of the strut housing. In any event, the inside surfaces of the collar fittings are rounded to generally match the contour of the strut housing. It is preferred to attach the collar to the housing 26 just below the spring guide 27.

The front collar fitting has a generally U-shaped bracket 52 projecting outwardly toward the swivel fitting of the arm 28. The swivel fitting fits into the interior of the bracket and a swivel pin 54 pivotally attaches the end of the swivel fitting to the bracket. Thus, the end of the force-applying arm is able to pivot about a transverse axis adjacent the collar, in which the pivot axis is spaced to the rear of and generally parallel to the rear face of the base 12.

The collar shown in FIG. 1. is attached to the upper hole 20 of the bracket 18. This facilitates use of the camber adjusting tool on relatively longer McPherson struts. Alternatively, the lower hole 22 can be used for attaching the collar to a lower point on the bracket for use with generally shorter McPherson struts.

A larger circular opening 56 is formed in a central region of the base. The central opening facilitates mounting the base over a front face of a stud mounting plate 58 on the front of a wheel hub of the McPherson suspension system. The stud mounting plate is part of the wheel hub, but for simplicity, the following description will refer to the tool being mounted on the hub. A plurality of wheel mounting studs 60 project from the hub. The studs are normally used for fastening the wheel of the vehicle to the hub. On the rear face 16 of the base 12 a narrow circular recess 61 is formed around the periphery of the central opening 56.

In the illustrated embodiment, four circumferentially spaced apart elongated holes 64 extend through the base at equidistantly spaced apart locations around the central opening 56. The long dimension of each elongated hole extends radially outwardly from the central opening 56 so that the four elongated holes extend angularly away from the central opening. The illustrated embodiment shows four such elongated holes, one for each stud 60 extending from the wheel hub. The axes of the holes 64 are all on a common center, and they pass through the center of the central opening 56 in the base 12. The holes are elongated to allow the camber adjustment tool to be mounted on wheel hubs with different wheel stud patterns, i.e., with differences in the distance of each mounting stud from the center of the hub. A separate circular recess 66 is formed in the front face of the base around each elongated hole. Each recess is larger in diameter than the long dimension of each elongated hole. Each recess has the same uniform depth. The number of elongated holes can vary for hubs having different numbers of wheel studs.

An instrument mounting bridge 68 is rigidly affixed to the front face of the base. The bridge is spaced from and extends over the elongated holes 64. The bridge includes a flat instrument mounting plate 70 spaced from and extending parallel to the front and rear faces of the base 12. The flat instrument mounting plate is spaced from the base by opposite side walls 72 rigidly secured along opposite side edges of the base. Four separate circular access holes 74 in the instrument mounting plate 70 are located above the four corresponding elongated holes in the base 12. The access holes are preferably larger than the long dimension of the elongated holes 64. A small circular hole 76 is formed in the center of the instrument mounting plate 70, i.e., at the common center of radial axes drawn through the center of each access hole 74. The small hole 76 provides means for securing a camber measuring and indicating gauge to the instrument mounting plate 70. The access holes 74 provide access to the mounting studs that extend through the corresponding elongated holes 64 in the base 12.

An adjustable mounting foot 78 is attached to the bottom of the base 12. The mounting foot includes a generally L-shaped mounting plate having a generally horizontally extending foot 80. An upright extension plate 82 overlies the rear face of the base. The extension plate is slidable along the length of the base to lengthen or shorten the distance between the foot and the bottom edge of the plate for adjusting the desired elevation of the central hole 56 and stud-receiving holes 64 above a floor on which the foot rests.

The adjustable foot is held in a fixed desired position on the bottom of the base by a pair of adjustable bolts 84 extending through corresponding elongated slots 86 in the extension plate 82. The bolts are threaded into corresponding holes 88 in the base 12 and tightened against the rear face of the extension plate for holding the adjustable foot in a fixed position on the base. The bolts can be loosened to permit sliding travel of the extension plate along the length of the base. The slots 86 permit such sliding travel which provides infinite adjustability of the distance between the foot and the bottom edge of the plate. Guides 90 are rigidly affixed to opposite edges of the extension plate and overlap opposite edges of the base for guiding sliding movement of the slidable plate along the base.

Once the adjustable foot is secured in the desired position by tightening the bolts 84, an adjustable support rod 92 can be positioned to provide a rigid means of vertical support between the foot and the base. The support rod 92 comprises an elongated externally threaded shaft engaged with an internally threaded opening in a fixed nut 94 projecting from the bottom edge of the base. The bottom of the threaded shaft has a head 96 that can bear against the top of the foot 80. The rod is turned on its axis to move the head 96 downwardly until it rests on top of the foot. The rod in this position provides a rigid means of support that takes the pressure off the adjustment bolts 84 when the tool supports the weight of a vehicle above the floor.

Figure 4:
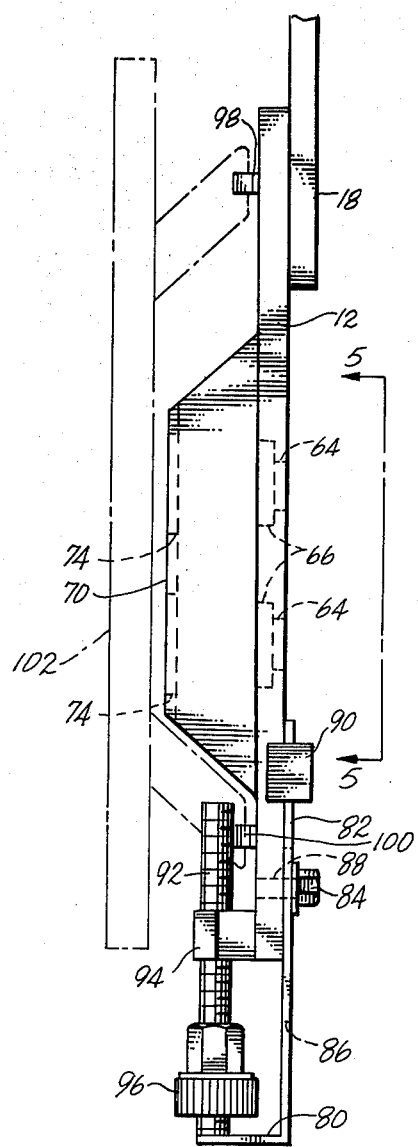
FIG. 4 is a fragmentary side elevation view taken on line 4—4 of FIG. 2 and showing the tool detached from the suspension system.

The camber adjusting tool also includes an upper support bar 98 secured to the front face of the base 12 and extending generally horizontally across the base above the mounting bridge 68. A corresponding lower mounting bar 100 extends parallel to the upper bar adjacent the bottom portion of the mounting bridge. The upper and lower bars can facilitate mounting a support 102 (see FIG. 4) for electronic equipment for measuring camber, caster and toe-in.

The camber adustment tool is used by first jacking up the front end of the vehicle and removing the wheel to expose the mounting studs on the wheel hub. The camber adjustment tool is then mounted on the wheel hub while the jack is in place supporting the front end of the vehicle above the floor. The adjustment tool is attached to the studs 60 by extending the studs through the corresponding elongated holes 64 in the base 12 of the tool. A separate cammed sleeve 103 is inserted in each elongated hole and placed around each stud. The sleeves protect the threads of the studs from damage that could otherwise be caused by the weight of the tool bearing against the threads on the studs. Each sleeve has a enlarged cam face 104 that seats in the recess 66 surrounding each elongated hole. The cam face on each sleeve is rotated to a position in which it fits into the recess around each elongated hole. The cam faces of the sleeves thus can be positioned in each recess to accommodate different wheel stud patterns, i.e., different spacings between the wheel studs. A separate lug nut 106 is then tightened against each cam face for tightly securing the tool to the wheel hub. The elongated cam faces provide good bearing surfaces for applying pressure for securely holding the tool in place on the wheel hub. There is a need for a good bearing surface, and the cam face provides full contact with each lug nut independently of the spacing between the mounting studs, so that when the lug nuts are tightened they can bear against the cam faces for securely fastening the tool to the hub. The wheel hub mounting studs protrude through an opening 108 in each sleeve and cam face, and each lug nut 106 is tightened onto the end portions of each stud that protrudes through the cam face.

FIG. 7 shows an alternative arrangement for securing the tool to a wheel hub for mag wheels having longer lug nuts 110 for holding the wheels in place. In this embodiment, the same sleeve is first inserted into each elongated hole for protecting the wheel mounting studs 60. A pair of washers 112 and 114 are then inserted over the cam face of the sleeve to act as spacers, after which the lug nut 110 is fastened to the outer end of each wheel mounting stud.

The enlarged holes 74 in the bridge 70 provide means for access for inserting each cam sleeve and for adjusting the lug nuts to tighten the adjustment tool in place.

Once the tool is in place on the hub, the adjustable foot at the bottom of the tool is extended downwardly to the floor and the adjustment bolts at the rear of the foot are tightened so that the tool can support the wheel hub above the floor independently of the jack, or any other means for elevating the front end of the vehicle. The sliding foot provides an infinite means of adjustment for accurately positioning the center of the wheel hub at the required elevation above the floor. After the adjustment bolts for the adjustable foot are tightened, the support rod 92 is lowered to provide means for resisting the weight of the vehicle being held above the floor by the camber adjustment tool.

The instrument mounting bridge is automatically positioned parallel to the face of the wheel hub. The face of the wheel hub fits into the central opening in the base 12, and attachment of the base to the wheel studs automatically positions the face of the bridge 70 parallel to the face of the wheel hub. The recess 60 in the rear face of the base accommodates oversized wheel hubs or wheel hubs that are not machined quite circular. The flat face of the bridge provides a support surface to which a magnetic camber measuring gauge can be fastened. The instrument mounting bridge is spaced sufficiently far from the base that the lug nuts do not interfere with a gauge fastened to the bridge. The parallel face 70 of the instrument mounting bridge also ensures proper alignment of the camber gauge relative to the wheel hub. Some wheel stud configurations do not permit direct attachment of a magnetic gauge to the wheel hub or to a flat plate of a camber correction tool attached directly to the wheel hub. Wheel stud patterns also can interfere with different types of gauges. By offsetting the flat support surface for the magnetic gauge from the hub and the portions of the tool attached directly to the hub, the present invention ensures use of magnetic gauges with all wheel hub configurations. The camber reading also is accurate because the face 70 of the mounting bridge is parallel to the face of the hub, when the tool is fastened to the hub. The face 70 of the mounting bridge also is rigidly affixed to the same rigid means of attachment to the hub and is spaced closely adjacent to where the hub is attached to the tool, ensuring accurate camber readings.

The bars 98 and 100 above and below the bridge provide an additional means for mounting newer electronic equipment for adjusting camber, caster and toe-in. These gauges are automatically positioned parallel to the face of the wheel hub by their attachment to the bars 98, 100.

The adjustable foot includes the sliding plate with elongated holes to provide a means of adjusting the elevation of the tool for different vehicle wheel heights. Before the wheel is removed the elevation of the center of the hub above the floor is initially measured. After the wheel is removed and the adjustment tool is secured to the wheel studs, the adjustable foot at the bottom of the tool is positioned to support the front end of the vehicle at this same elevation above the floor.

The tool is then used to adjust the camber setting. The collar 24 is fastened around the portion of the McPherson strut below the spring guide. The collar is fastened around this portion of the strut, which is usually reinforced, or of greater wall thickness than the main body of the strut. The threaded portion of the force-applying arm 28 is fastened to either the upper hole 20 or the lower hole 22 of the bracket 18, depending upon the length of the strut. That is, for longer struts the upper hole is used, and for shorter struts the lower hole is used. The swivel fitting 38 permits angular pivoting of the arm to also accommodate differences in the length of the strut. The operator then notes the initial camber setting on the magnetic or electronic camber setting gauge. The arm is then moved progressively toward or away from the strut to apply lateral pressure to the strut for applying bending forces for either increasing or decreasing wheel camber. The pressure is constantly retained on the strut because of the rigid attachment of the arm to the bracket 18. For example, by tightening the nut 36 against the rear face of the bracket 18, the adjustment rod is pushed toward the strut, which increases camber. Conversely, by tightening the nut 30 against the front face of the bracket 18, the adjustment rod pulls the strut toward the tool, which decreases camber. This movement of the adjustment rod can be continued progressively, in either direction until the desired camber setting is indicated on the gauge mounted to the face 70 of the bridge.

The circumference of the collar is not truly circular, so that the collar can be adjusted to fit around strut housings of different sizes. When the collar is fastened around the strut housing, it applies the pressure of adjustment around the circumference of the housing, rather than concentrating it in one location, which could damage the tube by point loading. The adjustment nuts 30 and 36 provide positive and accurate positioning of force-applying arm toward and away from the strut. This provides an improvement over a camber adjustment tool using a hydraulic ram for applying force against the McPherson strut. This is especially true for a hydraulic ram configuration which requires a chain wrapped around the tube of the strut in order to apply a retracting force for decreasing camber. In this instance, the links of the chain can damage the tube housing under the large forces applied for bending the strut. Use of a chain also is cumbersome and time consuming. The present invention avoids point loading on the strut, it avoids damage to the strut housing, it ensures proper camber readings, and it facilitates reasonably quicker camber adjustments.

I claim:

1. A tool for adjusting the wheel camber of a vehicle suspension system having a strut extending along an axis adjacent a wheel hub, the strut being inside a strut housing below a spring guide, the tool comprising:
    a rigid base lying in a plane and having a lower portion and an upper portion;
    means for fastening the lower portion of the base to the hub so the upper portion of the base is held in a fixed position spaced from the strut;
    an elongated force-applying arm attached to a point on the upper portion of the base and extending generally perpendicularly away from the plane of the base to a remote end spaced from the base;
    a collar having at least a pair of curved fittings that cooperate to form a ring-like force-distributing member surrounding a central axis of the collar;
    swivel means attaching the remote end of the force-applying arm to a side of the collar between the central axis of the collar and the upper portion of the base so the axis of the force-applying arm is in direct line with the central axis of the collar, the swivel means allowing the collar to pivot relative to the arm about an axis generally perpendicular to the axis of the arm;
    means for releasably securing the curved fittings of the collar around the circumference of the strut housing; and
    means for adjusting the point of attachment of the force-applying arm to the upper portion of the base, wherein the force-applying arm extends through the upper portion of the base and including first and second adjustment nuts engaged with the arm adjacent opposite faces of the upper portion of the base, each adjustment nut being independently movable along the arm toward or away from a corresponding face of said upper portion of the base for moving the arm and the collar toward or away from the upper portion of the base for applying force to either of two opposite sides of the strut through the collar in a direction in line with the axis of the strut and for retaining said force on the strut for adjusting the wheel camber of the suspension system.

2. Apparatus according to claim 1 including a central opening extending through a planar rear face of the base for receiving a portion of the wheel hub; and elongated holes in the base extending radially away from the central opening and being equidistantly spaced apart circumferentially around the central opening, the elongated holes having a longer axis extending radially away from said central opening.

3. Apparatus according to claim 2 including a rigid instrument mounting plate rigidly affixed to a side of the base opposite said rear face, the mounting plate being spaced from and adjacent to said elongated holes, said mounting plate having a front face extending parallel to the rear face of the base.

4. Apparatus according to claim 3 including one or more access holes in the instrument mounting plate for providing access to the elongated holes.

5. Apparatus according to claim 2 in which the hub includes separate mounting studs for extending through each elongated hole; and including a separate sleeve for being inserted into each elongated hole to fit around each stud and protect the stud from engagement with the portion of the base surrounding each hole.

6. Apparatus according to claim 5 including a separate enlarged face on each sleeve for providing a bearing surface for a lug nut threaded onto the stud.

7. Apparatus according to claim 2 including means for adjusting the elevation of said elongated holes above the floor, comprising a foot for resting on the floor, an upright slide member secured to the foot and slidably overlying the base, and means for releasably attaching the slide member to the base to provide an infinite means of adjusting the distance between the foot and the point of attachment of the slide member to the base.

8. Apparatus according to claim 7 including an elongated support member for extending between the base and the foot to support the weight of the base above the floor.

9. Apparatus according to claim 1 in which the base includes a plurality of equidistantly spaced apart holes extending through a planar rear face of the base for receiving wheel mounting studs on the wheel hub; and including a rigid instrument mounting plate rigidly affixed to a side of the base opposite said rear face, the mounting plate being spaced from and adjacent to said holes, said mounting plate having a front face extending parallel to the rear face of the base.

10. Apparatus according to claim 9 including one or more access holes in the instrument mounting plate for providing access to said holes.

11. Apparatus according to claim 1 in which the base includes a plurality of equidistantly spaced apart holes for receiving mounting studs extending from a wheel hub; and including a separate sleeve for being inserted into each hole to fit around each stud to protect the stud from engagement with the portion of the base surrounding the hole.

12. Apparatus according to claim 11 including a separate enlarged face on each sleeve for providing a bearing surface for a lug nut threaded onto each stud.

13. Apparatus according to claim 12 including a separate recess formed in the face of the base around each hole, and in which the enlarged face on each sleeve can fit into the recess when the sleeve is inserted in the hole.

14. Apparatus according to claim 13 in which the enlarged face is a cam.

15. Apparatus according to claim 1 including means for adjusting the elevation of the base above the floor, comprising a foot for resting on the floor, an upright slide member secured to the foot and slidably overlying the base, and means for releasably attaching the slide member to the base to provide an infinite means of adjusting the distance between the foot and the point of attachment of the slide member to the base.

16. A tool for adjusting the wheel camber of a vehicle suspension system having a strut extending adjacent a wheel hub, the tool comprising:
   a rigid base having a planar rear force;
   means for fastening the base to the hub, comprising a central opening in the rear face of the base for receiving a portion of the wheel hub, the base having elongated holes extending radially away from the central opening and being equidistantly spaced apart circumferentially around the central opening, the elongated holes having a longer axis extending radially away from said central opening;
   a rigid instrument mounting plate affixed to a side of the base opposite said rear face, the mounting plate being spaced from and adjacent to said elongated holes, said mounting plate having a front face extending generally parallel to the rear face of the base;
   an elongated force-applying arm attached to the base and having a remote end spaced from the base;
   a collar;
   means attaching the collar to the remote end of the force-applying arm;
   means for releasably securing the collar around the circumference of the strut; and
   means for adjusting the point of attachment of the arm to the base for moving the arm and the collar toward or away from the base to a selected position on the base for retaining the arm in said selected fixed position for applying force to either of two opposite sides of the strut and for retaining said force for adjusting the wheel camber of the suspension system.

17. Apparatus according to claim 16 including one or more access holes in the instrument mounting plate for providing access to said elongated holes.

18. A tool for adjusting the wheel camber of a vehicle suspension system having a strut extending adjacent a wheel hub, and in which the hub includes separate mounting studs, the tool comprising:
   a rigid base;
   means for fastening the base to the hub, comprising a central opening extending through a planar rear face of the base for receiving a portion of the wheel hub, the base further including elongated holes extending radially away from the central opening and being equidistantly spaced apart circumferentially around the central opening, the elongated holes having a longer axis extending radially away from said central opening, whereby the separate mounting studs on the hub can extend through said elongated holes;
   a separate sleeve for being inserted into each elongated hole to fit around each stud to protect the stud from engagement with the portion of the base surrounding each hole;
   an elongated force-applying arm attached to the base and having a remote end spaced from the base;
   a collar;
   means attaching the collar to the remote end of the force-applying arm;
   means for releasably securing the collar around the circumference of the strut; and
   means for adjusting the point of attachment of the arm to the base for moving the arm and the collar toward or away from the base to a selected position on the base for retaining the arm in said selected fixed position for applying force to either of two opposite sides of the strut and for retaining said force for adjusting the wheel camber of the suspension system.

19. Apparatus according to claim 18 including a separate enlarged face on each sleeve for providing a bearing surface for a lug nut threaded onto the stud.

20. A tool for adjusting the wheel camber of a vehicle suspension system having a strut extending adjacent a wheel hub, the tool comprising:
   a rigid base;
   means for fastening the base to the hub, said fastening means including a central opening extending through a planar rear face of the base for receiving a portion of the wheel hub, said base further including elongated holes extending radially away from the central opening and being equidistantly spaced apart circumferentially around the central opening, the elongated holes having a longer axis extending radially away from said central opening;
   means for adjusting the elevation of said elongated holes above the floor, comprising a foot for resting on the floor, an upright slide member secured to the foot and slidably overlying the base, and means for releasably attaching the slide member to the base to provide an infinite means of adjusting the distance between the foot and the point of attachment of the slide member to the base;
   an elongated force-applying arm attached to the base and having a remote end spaced from the base;
   a collar;
   means attaching the collar to the remote end of the force-applying arm;
   means for releasably securing the collar around the circumference of the strut; and
   means for adjusting the point of attachment of the arm to the base for moving the arm and the collar toward or away from the base to a selected position on the base for retaining the arm in said selected fixed position for applying force to either of two opposite sides of the strut and for retaining said force for adjusting the wheel camber of the suspension system.

21. Apparatus according to claim 20 including an elongated support member for extending between the base and the foot to support the weight of the base above the floor.

22. A tool for adjusting the wheel camber of a vehicle suspension system having a strut extending adjacent a wheel hub, the tool comprising;
   a rigid base;

means for fastening the base to the hub, said fastening means including a plurality of equidistantly spaced apart holes extending through a planar rear face of the base for receiving wheel mounting studs on the wheel hub;

a rigid instrument mounting plate affixed to a side of the base opposite said rear face, the mounting plate being spaced from and adjacent to said holes, said mounting plate having a front face extending generally parallel to the rear face of the base;

an elongated force-applying arm attached to the base and having a remote end spaced from the base;

a collar;

means attaching the collar to the remote end of the force-applying arm;

means for releasably securing the collar around the circumference of the strut; and means for adjusting the point of attachment of the arm to the base for moving the arm and the collar toward or away from the base to a selected position on the base for retaining the arm in said fixed position for applying force to either of two oposite sides of the strut and for retaining said force for adjusting the wheel camber of the suspension system.

23. Apparatus according to claim 22 including one or more access holes in the instrument mounting plate for providing access to said holes.

24. A tool for adjusting the wheel camber of a vehicle suspension system having a strut extending adjacent a wheel hub, the tool comprising:

a rigid base;

means for fastening the base to the hub, the fastening means including a plurality of equidistantly spaced apart holes for receiving mounting studs extending from a wheel hub, and including a separate sleeve for being inserted into each hole to fit around each stud to protect the stud from engagement with the portion of the base surrounding the hole;

a elongated force-applying arm attached to the base and having a remote end space from the base;

a collar;

means attaching the collar to the remote end of the force-applying arm;

means for releasably securing the collar around the circumference of the strut; and means for adjusting the point of attachment of the arm to the base for moving the arm and the collar toward or away from the base to a selected position on the base for retaining the arm in said selected fixed position for applying force to either of two opposite sides of the strut and for retaining said force for adjusting the wheel camber of the suspension system.

25. Apparatus according to claim 24 including a separate elongated face on each sleeve for providing a bearing surface for a lug nut threaded onto each stud.

26. Apparatus according to claim 25 including a separate recess formed in the face of the base around each hole, and in which the enlarged face of each sleeve can fit into the recess when the sleeve is inserted into the hole.

27. Apparatus according to claim 26 in which the enlarged face is a cam.

28. A tool for adjusting the wheel camber of a vehicle suspension system having a strut extending adjacent a wheel hub, the tool comprising:

a rigid base;

means for fastening the base to the hub;

means for adjusting the elevation of the base above the floor, comprising a foot for resting on the floor, an upright slide member secured to the foot and slidably overlying the base, and means for releasably attaching the slide member to the base to provide an infinite means of adjusting the distance between the foot and the point of attachment of the slide member to the base;

an elongated force-applying arm attached to the base and having a remote end spaced from the base;

a collar;

means attaching the collar to the remote end of the force-applying arm;

means for releasably securing the collar around the circumference of the strut; and means for adjusting the point of attachment of the arm to the base for moving the arm and collar toward or away from the base to a selected position on the base for retaining the arm in said selcted fixed position for applying force to either of two oposite sides of the strut and for retaining said force for adjusting the wheel camber of the suspension system.

* * * * *

UNITED STATES PATENT AND TRADEMARK OFFICE
CERTIFICATE OF CORRECTION

PATENT NO. : 4,305,570

DATED : December 15, 1981

INVENTOR(S) : John H. Castoe

It is certified that error appears in the above—identified patent and that said Letters Patent is hereby corrected as shown below:

```
     Column 1, line 46, "type" should read -- types --.
Column 3, line  50, "larger" should read -- large --.
Column 5, line 28, "a" should read -- an --.  Column 10,
line 67, claim 22, ";" should read -- : --.  Column 11,
line 21, claim 22, after "said" insert -- selected --;
line 34, claim 24, "equdistantly" should read -- equi-
distantly --; line 41, claim 24, "a" should read -- an --.
Column 12, line 42, claim 28, "selcted" should read
-- selected --; line 44, claim 28, "oposite" should read
-- opposite --.
```

Signed and Sealed this

Twenty-third Day of March 1982

[SEAL]

Attest:

GERALD J. MOSSINGHOFF

Attesting Officer    Commissioner of Patents and Trademarks